United States Patent Office 3,402,154
Patented Sept. 17, 1968

3,402,154
PRODUCTION OF HIGH MOLECULAR WEIGHT POLYMERS OF VICINAL EPISULFIDES
Roy Larsen, Lambertville, N.J., assignor to Thiokol Chemical Corporation, Bristol, Pa., a corporation of Delaware
No Drawing. Filed Sept. 2, 1965, Ser. No. 484,749
16 Claims. (Cl. 260—79)

ABSTRACT OF THE DISCLOSURE

The poly(vicinal episulfides) formed by polymerizing reaction monomer systems containing a major amount of vicinal episulfides in the presence of an episulfide polymerization catalyst which had been compacted until its bulk density was not less than 300 grams per liter are normally solid, granular, high molecular weight polymers having bulk densities approximately equal to that of the particular compacted episulfide polymerization catalyst from which such polymers were prepared. Moreover, by increasing the bulk density of the compacted episulfide polymerization catalyst over the range from 300 to about 800 grams per liter, it is possible to obtain polymers having approximately the same bulk density as that of the compacted catalyst from which the polymer was prepared, which provides a unique method for controlling the bulk densities of high molecular weight, thermoplastic polymers of vicinal episulfides during the polymerization reaction.

---

This invention relates to polymers of vicinal episulfides and, more particularly, to the production of normally solid, granular, high molecular weight polymers of vicinal episulfides having high bulk densities. The invention is based on the discovery that when vicinal episulfides are polymerized in the presence of a new type of composite seed catalyst, in which a catalytically active mixture of polymer and an episulfide polymerization catalyst has been compacted so that its bulk density is not less than 300 grams per liter, it is possible to produce normally solid, granular, high molecular weight polymers of vicinal episulfides having bulk densities approximately equal to the bulk density of the particular composite seed catalysts from which such polymers are prepared. The invention provides an improved process for the production of normally solid, granular, high molecular weight polymers of vicinal episulfides having high bulk densities, as well as to the granular, high bulk density, high molecular weight poly (vicinal episulfides) which may be produced by this process.

Vicinal episulfides may be polymerized to various types of high molecular weight polymers, including both thermoplastic and elastomeric polymers, which exhibit an unusual range of physical and chemical properties. During an exhaustive investigation into the polymerization of vicinal episulfides, research investigators at the laboratories of Thiokol Chemical Corporation discovered a new class of high molecular weight thermoplastic polymers in which the major amount of recurring groups is derived from ethylene sulfide and which possess a unique combination of high temperature stability and inertness to chemicals, which properties should qualify these thermoplastic polymers for general use as engineering plastics. Moreover, new processes were developed at Thiokol Chemical Corporation for the preparation of these thermoplastic polymers by polymerizing a monomer reaction system containing ethylene sulfide in the presence of many different types of episulfide polymerization catalysts, one of the most efficient of which catalysts was found to be the highly active polymeric zinc oxide formed by reacting a zinc dialkyl with water or a comparable electron donor. In general, the most catalytically active of these episulfide polymerization catalysts were those produced from Group II-B metal compounds, such as zinc, cadmium, or mercury.

No matter what type of episulfide polymerization catalyst is employed, however, the polymerization of monomer reaction systems containing a major amount of ethylene sulfide to high molecular weight, thermoplastic polymers suitable for general use as engineering plastics invariably yields a very finely divided, fluffy material which is characterized by a low bulk density, generally in the range from 50 to 150 grams per liter. Low bulk density polymers require exceptionally large volume reactors and processing equipment to produce a relatively small quantity of polymer, since the fluffy properties of the polymer dictate the use of relatively large volumes of reaction solvents to maintain control over the polymerization reaction. Moreover, because of the inherent low bulk density of these thermoplastic polymers, some difficulties may be experienced in using these polymers in standard molding equipment.

Using episulfide polymerization catalysts which had been compacted until their bulk densities were not less than 300 grams per liter, I have found in all instances that the poly(vicinal episulfides) formed by polymerizing reaction monomer systems containing a major amount of vicinal episulfides in the presence of such compacted episulfide polymerization catalysts yielded normally solid, granular, high molecuar weight polymers having bulk densities approximately equal to that of the particular compacted episulfide polymerization catalysts from which such polymers were prepared. Moreover, by increasing the bulk density of the compacted episulfide polymerization catalyst over the range from 300 to about 800 grams per liter, I have also found that it is possible to obtain polymers having approximately the same bulk density as that of the compacted catalyst from which the polymer was prepared, which provides a unique method for controlling the bulk densities of high molecular weight, thermoplastic polymers of vicinal episulfides during the polymerization reaction.

Based on these discoveries, the invention provides an improved process for the production of normally solid, granular, high molecular weight polymers of vicinal episulfides having a high bulk density which comprises (a) compacting a solid, episulfide polymerization catalyst until its bulk density is not less than 300 grams per liter and is approximately equal to the bulk density desired for the polymer which is to be prepared from such catalyst, and (b) polymerizing a monomer reaction system containing a major amount of a vicinal episulfide monomer by bringing the monomer reaction system into contact with a catalytic amount of the compacted episulfide polymerization catalyst, thereby forming a normally solid, granular, high molecular weight polymer in which the major amount of recurring groups is derived from the vicinal episulfide monomer contained in the monomer reaction system and which has a bulk density approximately equal to that of the compacted episulfide polymerization catalyst.

Although the process of the invention may be carried out merely by compacting a solid, episulfide polymerization catalyst to the desired bulk density and then polymerizing the vicinal episulfide in the presence of the compacted catalyst, by far the most efficient results have been obtained by initially polymerizing a first monomer reaction system containing at least one vicinal episulfide by bringing the monomer (or monomers) into contact with a catalytic excess of the episulfide polymerization catalyst to form a solid, low bulk density polymer without substantially diminishing the catalytic activity of the episulfide polymerization catalyst, thereby forming a catalytically active mixture of polymer and catalyst. This catalytically active mixture of low bulk density polymer and episulfide polymerization catalyst is then compacted until its bulk density is not less than 300 grams per liter and is approximately equal to the bulk density desired for the granular polymer which is to be prepared from such composite catalyst. Using this compacted catalyst, which may conveniently be termed a "composite seed catalyst," a second monomer reaction system containing a major amount of a vicinal episulfide is then polymerized to form a normally solid, granular, high molecular weight polymer in which the major amount of recurring groups is derived from the vicinal episulfide contained in the second monomer reaction system and which has a bulk density approximately equal to that of the composite seed catalyst.

Many different types of vicinal episulfides may be used to form the composite seed catalyst, since the resultant polymer component of the composite seed catalyst appears to function as an exceptionally efficient carrier for the episulfide polymerization catalyst. That the exposed surface of the composite seed catalyst is not the sole point of catalytic activity has been demonstrated by incorporating carbon black into the composite seed catalyst prior to compacting. Upon using this "tagged" compacted seed catalyst in the homopolymerization of ethylene sulfide, the resultant polymer was found to contain carbon black uniformly distributed throughout each polymer particle. Consequently, the polymerization reaction must have occurred in the interstices as well as on the exposed surface of the composite seed catalyst, for if it had occurred solely on the exposed surface of the catalyst, the carbon black would have been concentrated at the center of each of the polymer particles formed during the reaction.

As used herein, the term "normally solid, granular, high molecular weight polymers of vicinal episulfides having a high bulk density" includes any polymers (whether linear or branched-chain homopolymers, copolymers, or other types of interpolymers) in which the major amount of recurring groups is derived from a vicinal episulfide

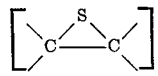

and which is characterized by (a) a melt index, at 215° C., of less than 2.5 grams per minute (which melt index is a measure of the molecular weight of the polymer), (b) a melting point of not less than 150° C., and (c) a bulk density not less than 300 grams per liter. The term "episulfide polymerization catalyst" includes any catalyst or catalytically active compound or compounds which are capable of polymerizing a vicinal episulfide to a normally solid, high molecular weight polymer having a melting point of not less than 150° C. and a melt index, at 215° C., less than 2.5 grams per liter.

The melt index is the only practical criterion for characterizing the molecular weight of the thermoplastic poly (vicinal episulfides), since these polymers are insoluble in every solvent tested under those conditions at which molecular weight determinations normally could be made. The melt index may be defined as an empirical measure of the rheological properties of the polymer which, in turn, are related to its molecular weight. Since the thermal degradation of a polymer also results in the formation of lower molecular weight components, the melt index may also be used as an indication of the degradation of the polymer.

The numerical values for all of the melt indices set forth herein were measured on a capillary flow plastometer manufactured by F. F. Slocomb Corporation, Wilmington, Del., using a test procedure which generally conformed to ASTM Method D–1238–57T. In determining the melt indices by the test procedure used, the plugged reservoir of the capillary flow plastometer was preheated to and maintained at a temperature of 215°±1° C. Within 2 minutes after the reservoir had reached this temperature, it was charged with 4 to 6 grams of polymer and a 5 kilogram weight was then placed atop the polymer charge by means of a ram and left in that position for exactly 2 minutes. The 5 kilogram weight was then removed and replaced with a 2160 gram weight. After an additional 15 seconds, the plug was removed from the flow orifice of the reservoir, and the flow of polymer through the orifice during each 1 minute interval was separately collected and weighed to the nearest milligram. Consequently, whenever the term "melt index at 215° C." is used herein, it refers to the average of the weights of the five separate samples each of which was collected at 1 minute intervals over the first 5 minutes of the test procedure. If an aggregate of 3.5 grams of polymer flows through the orifice during the first 5 minutes of the test procedure, then the melt index would be 0.7 gram per minute. All of the normally solid, high molecular weight polymers of vicinal episulfides produced in accordance with the process of the invention possess a melt index, at 215° C., of less than 2.5 grams per minute and, in many instances, melt indices (at 215° C.) in the range from 0.5 to 1.5 grams per minute, which indicates that the polymers have a high molecular weight.

Among the most effective episulfide polymerization catalysts which may be used to produce normally solid, granular, high molecular weight polymers of vicinal episulfides having a high bulk density in accordance with the process of the invention are the polymeric Group II–B metal compounds formed by reacting an organometallic compound having the formula $R_2M$, in which R may be an alkyl or aryl group and M is a Group II–B metal (such as zinc, cadmium or mercury), together with an electron donor compound, such as water, hydrogen sulfide, primary and secondary amines (such as methyl-, ethyl- and diethylamine), alcohols (such as ethanol and mercaptoethanols), glycols (such as ethylene glycol and propylene glycol), ketones (such as acetone and methyl ethyl ketone), carboxylic acids (such as acetic and propionic acids), and aldehydes (such as butyraldehyde), all of which electron donor compounds react with these organometallic compounds to form episulfide polymerization catalysts. Particularly satisfactory episulfide polymerization catalysts have been prepared from the reaction of such organometallic compounds as diethyl zinc, dibutyl zinc, diphenyl zinc, diphenyl mercury, and diethyl cadmium, with such electron donor compounds as water, ethanol, acetone, and n-butyl mercaptan. The preparation and use of these particular episulfide polymerization catalysts are described more fully in the copending United States patent application of Riad H. Gobran et al., Ser. No. 357,300, filed Apr. 3, 1964 now Patent No. 3,365,429.

Other episulfide polymerization catalysts based on Group II–B metal compounds may also be used to produce normally solid, granular, high molecular weight polymers of vicinal episulfides having a high bulk density in accordance with the process of the invention. Such episulfide polymerization catalysts include the carbonates, oxides, peroxides, sulfides, chromates, adipates, oxalates, sulfates and silicates of Group II–B metals, such as zinc, cadmium or mercury. The use of these particular episulfide polymerization catalysts is disclosed more fully in the copending United States patent applications of Ernest L. Kutch et al., Ser. No. 255,657, filed Feb. 1, 1963 now abandoned; Stephen W. Osborn et al., Ser. No. 269,774, filed Apr. 1, 1963 now abandoned; and Stephen W. Osborn, Ser. No. 213,015, filed July 27, 1962.

The sole criterion for selection of an episulfide polymerization catalyst for use in the process of the invention is whether such catalyst is capable of polymerizing a vicinal episulfide, such as ethylene sulfide, to a high molecular weight polymer which has a melting point of not less than 150° C., and a melt index, at 215° C., less than 2.5 grams per minute.

In accordance with the process of the invention, prior to use in the final polymerization reaction the episulfide polymerization catalyst (alone or entrapped in a fluffy polymer) is compacted and then pulverized until its bulk density is not less than 300 grams per liter. Because fluffy particles have feather-like edges and pack very readily under small amounts of compression or shear, the standard ASTM method for measuring bulk density (ASTM Method D–1895) is not applicable, and the measurement of bulk density should be made in accordance with the same procedure presently used for determining the bulk density of fluorocarbon resins, namely by ASTM Method D–1457–62T. Consequently, whenever the term "bulk density" is used herein, it refers to the apparent density of the polymer (cited as the weight in grams of a volume of 1000 ml. of polymer), as measured by the method described in ASTM Method D–1457–62T.

Preparation of composite seed catalysts

Since the use of the composite seed catalysts to produce high bulk density polymers of vicinal episulfides constitutes one of the most important features of the process of the invention, the preparation of these composite seed catalysts will be discussed in some detail.

To prepare the composite seed catalyst, a small amount of a first monomer reaction system preferably containing at least one vicinal episulfide (not necessarily 50 mole percent) is brought into contact with a catalytic excess of the episulfide polymerization catalyst to polymerize the first monomer reaction system without substantially diminishing the catalytic activity of the episulfide polymerization catalyst, thereby forming a catalytically active mixture of the polymer and the episulfide polymerization catalyst. This polymer/catalyst mixture is generally fluffy or flocculent (the bulk density being from about 50 to 150 grams per liter), and must be compacted and pulverized until its bulk density is not less than 300 grams per liter, thereby forming the composite seed catalyst.

Any polymerizable vicinal episulfide or even vicinal epoxides may be used to prepare the composite seed catalyst, since the resultant polymer appears to merely function as a carrier for the episulfide polymerization catalyst. For example, highly active composite seed catalysts have been prepared from ethylene sulfide, isobutylene sulfide, styrene sulfide, ethylene oxide and styrene oxide, as well as various combinations of these monomers. Other monomers which may be used either alone or in combination with each other, and/or in combination with one or more of the aforementioned vicinal episulfide and vicinal epoxide monomers to form composite seed catalysts, include propylene sulfide, 1,2-butylene sulfide, 2,3-butylene sulfide, cyclohexene sulfide, vinyl cyclohexane episulfide, vinylcyclohexene episulfide, paramethylstyrene episulfide, butadiene episulfide, 2 - benzyl thiirane, 1,2-epoxy - 3,4 - epithiobutane, allyl thioglycidyl ether, and cyclic sulfides having the structure

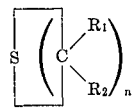

in which $n$ is an integer from 3 to 6, and $R_1$ and $R_2$ may be hydrogen, an alkyl group having from 1 to 10 carbon atoms, and/or an aryl, group, or $R_1$ or $R_2$ may also be heterocyclic, alicyclic, bicyclic or polycyclic, such as trimethylene sulfide, pentamethylene sulfide and hexamethylene sulfide. Moreover, compounds having the structure

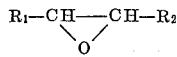

such as propylene oxide, 1,2-butylene oxide, 2,3-butylene oxide, may also be employed to form the composite seed catalyst. For best results, however, either ethylene sulfide alone, or ethylene sulfide in combination with minor amounts (generally less than 50 mole percent) of one or more of the other monomers, is preferred for the first monomer reaction system used to prepare the composite seed catalyst which, in turn, is employed in the process of the invention to produce the high molecular weight, high bulk density polymers.

Although any episulfide polymerization catalyst may be used to prepare the composite seed catalyst, particularly satisfactory results have been obtained using the reaction products of a Group II–B organometallic compound and an electron donor compound. These catalysts are usually prepared by reacting the two components in a suitable inert liquid reaction medium, such as benzene, hexane, tetrahydrofuran, petroleum ether or mineral oil. The mole ratio of the electron donor compound to the organometallic compound preferably should be in the range from 0.5:1 to 3:1, the optimum ratio usually being about 1:1. The reaction temperature employed in preparing the composite seed catalyst does not appear to be particularly critical and may vary from about 20° C. to about 100° C., the preferred range being from about 20° C. to about 50° C. In some cases, the boiling point of the liquid reaction medium will determine the upper temperature limit.

To insure maximum catalytic activity when a Group II–B organometallic compound/electron donor compound reaction product is used to prepare the composite seed catalyst, the catalyst system should be freshly prepared and used as soon as possible after its preparation. In some cases, it may be advantageous to prepare the catalyst in the polymerization reaction vessel just prior to or in conjunction with the initiation of the first polymerization reaction from which reaction products the composite seed catalyst is formed. If it is necessary to store the catalyst for any appreciable period of time before it is used to form the composite seed catalyst, say 48 hours or more, the activity of the catalyst may best be maintained by storage at reduced temperatures, preferably below room temperature. Since both oxygen and water are active reactants in the preparation of these episulfide polymerization catalysts, any free oxygen or water present in the atmosphere or in any of the materials used is capable of modifying the properties of such catalysts. Consequently, it is frequently desirable to prepare and use these highly active episulfide polymerization catalysts under an inert atmosphere.

Details of the polymerization reaction conditions employed in the preparation of the composite seed catalyst are set forth in the specific examples below. In general, the amount of the episulfide polymerization catalyst used to form the composite seed catalyst is in the range from about 0.05 to about 3 percent by weight of the first monomer reaction system. Since the amount of the episulfide polymerization catalyst employed to form the composite seed catalyst is equal to that ultimately required for the second polymerization reaction, the actual catalyst concentration employed to form the composite seed catalyst generally will be in excess of that normally required to initiate polymerization of a vicinal episulfide. Preparation of the catalytically active polymer/catalyst mixture from which the composite seed catalyst is formed may be carried out over a wide range of polymerization temperatures, generally from about 20° C. to about 100° C., the reaction period varying from a few minutes to forty-eight hours, or more, depending upon the particular reaction conditions.

The polymerization reaction used to form the catalytically active polymer/catalyst mixture may be conducted by any of various polymerization techniques, such as in bulk without solvent, or in a solvent or emulsion, or even in the vapor phase. Solvent polymerization is preferred in most instances, with or without agitation, using any commonly available inert solvent, such as benzene, toluene, xylene, isopentane, heptane, n-hexane, octane, carbon tetrachloride, methylene chloride, ethylene chloride, diethyl ether, dioxane, or tetrahydrofuran, to cite but a few.

In preparing the composite seed catalyst, it is not necessary to carry the polymerization reaction to completion. Highly active composite seed catalysts have been prepared from polymerization reactions which have been terminated after obtaining polymer yields as low as 2 percent and as high as 100 percent, based on the amount of monomer employed. After the polymerization reaction has been allowed to proceed to the desired extent the resultant catalytically active polymer/catalyst mixture is recovered from the reaction medium and dried. The polymer/catalyst mixture, which inherently possesses a low bulk density, preferably should be dried for about 15 to 20 hours at about 100° to 122° F. to provide a more easily handleable dry product.

Upon recovery from the reaction mixture, the catalytically active polymer/catalyst mixture, which contains substantially all of the original concentration of the episulfide polymerization catalysts without any apparent diminution of catalytic activity, is compacted into pellets or disks which are then preferably pulverized to pass through a No. 60 to No. 20 screen. The composite seed catalyst should be formed so that its bulk density is not less than 300 grams per liter and is approximately equal to the bulk density desired for the polymer which is to be prepared from such composite seed catalyst.

Use of composite seed catalysts

To produce normally solid, granular, high molecular weight polymers having a high bulk density in accordance with the process of the invention, a second monomer reaction system containing a major amount of a vicinal episulfide is brought into contact with a catalytic amount of the composite seed catalyst, thereby forming a normally solid, granular, high molecular weight polymer in which the major amount of recurring groups derived from the vicinal episulfide monomer or monomers contained in the second monomer reaction system and which has a bulk density approximately equal to that of the composite seed catalyst.

In carrying out this second polymerization reaction, the amount of composite seed catalyst employed is dependent, of course, on the amount of episulfide polymerization catalyst contained in the composite seed catalyst, the catalytic activity of which is due to the episulfide polymerization catalyst. As before, the polymerization reaction may be conducted at temperatures ranging from about 20° C. to about 100° C., and even higher, over reaction periods generally ranging from one-half to forty-eight hours, the shorter reaction times usually being employed at the higher reaction temperatures.

The resultant polymers are coarse, granular particles which may be readily recovered from the reaction mixture by centrifuging or filtration. Moreover, the bulk densities of these polymers are always approximately equal to the bulk density of the particular composite seed catalyst from which these polymers are prepared. Since the episulfide polymerization catalyst is not destroyed or removed in the second polymerization reaction, in theory, the high bulk density polymers may be used still further as composite seed catalysts, but this technique has practical limitations since the relative concentration of the episulfide polymerization catalyst in such polymers is less than that normally required for further polymerization reaction.

Before being used commercially as a thermoplastic molding material, these high bulk density polymers may be suitably compounded with fillers, coloring pigments, antioxidants, thermal and ultraviolet stabilizers, flame retardants, nucleating agents, and various other additives, depending upon the particular use for which such polymers are to be employed.

The following examples are illustrative of the preparation of normally solid, granular, high molecular weight polymers of vicinal episulfides having a high bulk density in accordance with the process of the invention:

EXAMPLE I

Preparation of catalyst.—To prepare a highly active episulfide polymerization catalyst, a solution of 13.7 g. (111 millimoles) of diethyl zinc in 100 ml. of n-heptane was added, with agitation, to a solution of 4 ml. (222 millimoles) of water in 400 ml. of tetrahydrofuran, thereby forming a white, gelatinous precipitate which was compacted by filtration and drying. The yield of dried, compacted precipitate was 9 g., the bulk of which was in the form of hard lumps. Prior to use in the polymerization reaction, these hard lumps were crushed to a finely divided, granular material having a high bulk density.

Homopolymerization of ethylene sulfide.—The polymerization reaction was carried out in a stainless steel bomb by charging the bomb with 100 g. of ethylene sulfide, 400 ml. of n-heptane, and 0.09 g. of the finely divided, granular, episulfide polymerization catalyst, and then agitating the reaction mixture at a temperature of 80° C. for 2 hours. The bomb was then cooled and the contents filtered and dried, yielding 15 g. of a granular, high molecular weight homopolymer of ethylene sulfide, M.P. 200–203° C., having a high bulk density. When the polymerization reaction was repeated under identical reaction conditions, but using a five-fold increase in catalyst concentration (0.45 g. of catalyst/100 g. of monomer) the yield of poly(ethylene sulfide) was 68 g., M.P. 202–205° C. In both instances, the bulk density of the polymer was approximately equal to the bulk density of the compacted episulfide polymerization catalyst used in each of the two polymerization reactions.

EXAMPLE II

Preparation of composite seed catalyst.—A solution of an episulfide polymerization catalyst in tetrahydrofuran was prepared in a 2.5-gallon solution bottle under a nitrogen atmosphere by sequentially adding to the solution bottle 2835 ml. of tetrahydrofuran 67.43 (0.546 mole) of diethyl zinc dissolved in n-heptane, and 9.838 ml. (0.546 mole) of water, during which addition agitation was provided by sparging nitrogen gas through the reactants. To a small pilot plant reactor, which had been purged with and was maintained under an atmosphere of nitrogen gas, were added 51.9 pounds of petroleum ether followed by 6.49 pounds of ethylene sulfide. After adjusting the temperature of the monomer reaction system to 78±2° F., the tetrahydrofuran solution of the episulfide polymerization catalyst was added to the monomer reaction system. The reaction mixture was agitated for a period of 1 hour at a temperature of 78±2° F., thereby forming a fluffy polymer (M.P. about 200° C.) of ethylene sulfide without substantially diminishing the catalytic activity of the episulfide polymerization catalyst. The bulk density of this fluffy polymer was about 100±50 grams per liter. The catalytically active mixture of fluffy polymer and episulfide polymerization catalyst was separated from the reaction mixture by centrifuging, and the mixture was then dried for 3 hours at a temperature of 160° F. to 180° F. under reduced pressure. The dried polymer/catalyst mixture was compacted into pellets, and the compacted pellets were then pulverized to pass through a No. 40 screen, yielding 1.3 pounds of a catalytically active composite seed catalyst having a bulk density of about 350±50 grams per liter. The bulk density of this composite seed catalyst was approximately equal to the bulk density desired for the various granular, high molecular weight polymers of vicinal episulfides which were substantially prepared from such composite seed catalyst.

Homopolymerization of ethylene sulfide.—To prepare a granular, high molecular weight poly(ethylene sulfide) having a high bulk density, a pressurized pilot plant reactor fitted with a stirrer was purged with nitrogen gas for 15 minutes and then charged with 120 pounds of petroleum ether and 60.1 pounds of ethylene sulfide, following which an additional 50 pounds of petroleum ether were charged into the reactor to flush any ethylene sulfide remaining in the charging line into the reactor. The composite seed catalyst (1.3 pounds) was added to the monomer reaction system in the reactor, the nitrogen feed was discontinued, the reactor was pressurized to form a bomb, and the temperature of the reaction mixture was gradually raised to 176±5° F. over a period of 1.5 hours, throughout which the reaction mixture was agitated. The polymerization reaction was continued at this temperature for an additional 2 hours, after which the reaction mixture was cooled to a temperature of less than 100° F. before opening the reactor. The resultant polymer was separated from the reaction mixture by centrifuging, and was then dried in vacuo at a temperature of 190° F. for 4 hours, yielding 80 percent of theory of a granular, high molecular weight poly(ethylene sulfide) having a high bulk density. Upon analysis, the polymer was found to have a bulk density of about 350±50 grams per liter, a melting point in the range from 202° C. to 205° C., and a melt index (at 215° C.) of less than 1.5 grams per minute.

EXAMPLE III

Preparation of composite seed catalyst.—A tetrahydrofuran solution of an episulfide polymerization catalyst was prepared in a 1-gallon solution bottle under a nitrogen atmosphere by reacting 4 ml. (222 millimoles) of distilled water with 37.4 g. (222 millimoles) of diethyl zinc in 2000 ml. of tetrahydrofuran. Upon standing the catalyst solution became a bright yellow. After aging for 36 hours, 400 ml. of the tetrahydrofuran solution of the episulfide polymerization catalyst were added, with agitation, over a period of 30 minutes to a reactor which contained 4000 ml. of benzene, 260 g. of freshly distilled ethylene sulfide and 172 g. of propylene sulfide. The reaction mixture, which was cooled in an ice water bath, was agitated for a period of 1 hour following the addition of the catalyst solution, at the end of which time a white, flocculent polymer had formed without substantially diminishing the catalytic activity of the episulfide polymerization catalyst. After separation by filtration, the flocculent polymer/catalyst mixture, which had a relatively low bulk density (ca. 50 to 80 grams per liter), was dried under reduced pressure and then compacted into disks which in turn were pulverized in a Waring Blendor to form the composite seed catalyst having a high bulk density. The total yield of the composite seed catalyst was 76 grams.

Copolymerization of ethylene sulfide and propylene sulfide.—to prepare a high bulk density copolymer of ethylene sulfide and propylene sulfide, a 5-liter resin reactor was charged with 2000 ml. of xylene and the solvent heated to a temperature of 115° C. When the temperature of the xylene had reached 115° C., 15.4 grams of the composite seed catalyst were added to the reactor. An ethylene sulfide/propylene sulfide monomer reaction system, consisting of 385.8 g. of ethylene sulfide and 115.2 g. of propylene sulfide, was added dropwise to the reactor over a period of 3 hours, during which time the temperature of the reaction mixture was maintained at 130° C. to 133° C. The reaction mixture was then cooled, the polymer reaction products separated by filtration, washed with 200 ml. of benzene and dried under reduced pressure, yielding 467.6 g. (90.6 percent of theory) of a copolymer, M.P. 162–193° C., having a bulk density approximately equal to that of the composite seed catalyst from which the copolymer was prepared.

EXAMPLE IV

Preparation of composite seed catalyst.—Under a nitrogen atmosphere, 100 ml. of the tetrahydrofuran solution of the diethyl zinc/water episulfide polymerization catalyst prepared in Example III was slowly added over a period of about 20 minutes to a reactor which contained 1000 ml. of benzene, 65 g. of ethylene sulfide, and 53 g. of 1,2-butylene sulfide, during which addition the temperature of the reaction mixture increased to about 37° C. The reaction mixture was cooled to about 25° C., using an ice bath, and maintained at this temperature for about 90 minutes, yielding a flocculent white precipitate without diminishing the catalytic activity of the episulfide polymerization catalyst. The flocculent polymer/catalyst mixture was filtered and then dried in vacuo at 50° C., yielding 31.8 g. of a copolymer catalyst mixture having a low bulk density. The fluffy copolymer/catalyst mixture was compacted into disks, and the compacted disks pulverized in a Waring Blendor to form the granular composite seed catalyst having a high bulk density.

Copolymerization of ethylene sulfide and 1,2-butylene sulfide.—A 1-liter resin reactor was charged with 400 ml. of xylene and the solvent heated to a temperature of 124° C., at which temperature 3.18 g. of the composite seed catalyst were added to the hot xylene. An ethylene sulfide/butylene sulfide monomer reaction system, consisting of a mixture of 73.4 g. of ethylene sulfide and 26.4 g. of 1,2-butylene sulfide, was added dropwise to the reactor over a period of 2 hours, during which time the reaction mixture was maintained at a temperature of 125–129° C. The reactor was cooled, the contents filtered, and the solid reaction product dried under reduced pressure, yielding 74.6 g. of a granular copolymer, M.P. 156–187° C., having a high bulk density.

EXAMPLE V

Copolymerization of ethylene sulfide and propylene sulfide.—To illustrate the use of a composite seed catalyst containing poly(ethylene sulfide) for the preparation of high bulk density copolymers, a 2-liter resin reactor was charged with 800 ml. of benzene and the solvent heated to a temperature of 128° C., at which temperature 6.2 g. of a composite seed catalyst prepared in accordance with Example II were added to the hot benzene. This composite seed catalyst (containing the homopolymer of ethylene sulfide) had a bulk density of 350±50 grams per liter. An ethylene sulfide/propylene sulfide monomer reaction system, consisting of a mixture of 159 g. of ethylene sulfide and 47.4 g. of propylene sulfide, was added dropwise to the reactor over a period of one and three-quarter hours, during which time the reaction mixture was maintained at a temperature of 125–129° C. The reactor was then cooled, the reaction product recovered by filtration, washed with 200 ml. of benzene, and then dried under reduced pressure, yielding 184.8 g. (92 percent of theory) of a granular copolymer, M.P. 168–192° C., having a bulk density approximately equal to that of the composite seed catalyst from which it was prepared.

EXAMPLE VI

Homopolymerization of ethylene sulfide.—To illustrate the preparation of high bulk density homopolymers of ethylene sulfide from a composite seed catalyst containing a copolymer of ethylene sulfide and propylene sulfide, a 1-liter resin reactor containing 400 ml. of xylene was heated to a temperature of 123° C., at which temperature 3.1 g. of the composite seed catalyst formed in accordance with Example III were added to the hot xylene. The polymer in this composite seed catalyst was a copolymer of ethylene sulfide and propylene sulfide. While the temperature of the reaction mixture was maintained at 120–126° C., 80 g. of ethylene sulfide were added dropwise to the reactor over a period of about three and three-quarter hours. After the usual work-up, which included washing with 200 ml. of benzene and drying in vacuo, there was obtained 50 g. of a granular, high molecular weight polymer composed primarily of poly(ethylene sulfide) and having a bulk density of about 350 grams per liter.

EXAMPLE VII

Copolymerization of ethylene sulfide and allyl thioglycidyl ether.—To a 3-liter resin reactor containing 1000 ml. of hot xylene (heated to 120° C.) was added 4.3 g. of a composite seed catalyst prepared in accordance with Example II. After the composite seed catalyst had been added to the hot xylene, a monomer reaction system consisting of a mixture of 90 mole percent ethylene sulfide and 10 mole percent allyl thioglycidyl ether was added dropwise to the reactor over a period of three and one-half hours until an aggregate of 144 g. of the monomer reaction system had been added. During the copolymerization reaction, the temperature of the reaction mixture varied from 128° C. to 114° C. The reaction mixture was cooled, filtered to remove the solid reaction product which, in turn, was washed with benzene and dried, yielding 41.6 g. of a granular, high molecular weight copolymer having a bulk density approximately equal to that of the composite seed catalyst from which the copolymer was prepared.

EXAMPLE VIII

Preparation of composite seed catalyst from diethyl zinc/ethanol.—To 200 ml. of tetrahydrofuran were added 5.46 ml. of diethyl zinc and 1.30 of ethanol and the mixture heated at reflux for a period of two and one-half hours, after which the tetrahydrofuran solution of the episulfide polymerization catalyst was added, with stirring, to a reactor which contained 400 ml. of benzene and 50 ml. of ethylene sulfide. Addition of the catalyst solution took place over a 30 minute period, after which the reaction mixture was stirred at room temperature for 15 hours. The polymer reaction product (containing the catalyst) was separated by filtration and then dried in vacuo, yielding 50 g. of a fluffy polymer/catalyst mixture having a low bulk density. The fluffy polymer/catalyst product was compacted into disks, and the compacted disks pulverized and screened to form a granular composite seed catalyst having a high bulk density.

Homopolymerization of ethylene sulfide.—To demonstrate the use of this composite seed catalyst in the homopolymerization of ethylene sulfide, a reaction mixture of 400 ml. of lactol spirits (i.e., a petroleum fraction, B.P. about 100° C., composed primarily of saturated hydrocarbons, such as heptane), 100 ml. of ethylene sulfide and 1.25 g. of the composite seed catalyst was maintained at a temperature of 80° C. for 2 hours, with agitation, after which the resultant polymer was recovered and dried, yielding 75 percent of theory of a granular, high molecular weight poly(ethylene sulfide) having a bulk density approximately equal to that of the composite seed catalyst from which the polymer was prepared.

EXAMPLE IX

Preparation and use of composite seed catalyst from diethyl cadmium/water for homopolymerization of ethylene sulfide.—To a clean, dry solution bottle were sequentially added 100 ml. of tetrahydrofuran, 0.2 ml. (11.1 millimoles) of distilled water, and 1.89 g. (11.1 millimoles) of diethyl cadmium dissolved in n-heptane, and the mixture heated at reflux for 1 hour, at which point the mixture had become yellow. The tetrahydrofuran solution of the episulfide polymerization catalyst was then added to 100 ml. of ethylene sulfide dissolved in 400 ml. of benzene, and the reaction mixture was heated to 60° C. and allowed to stand at that temperature overnight. Upon filtration, there was recovered 80 g. of a fluffy polymer containing the episulfide polymerization catalyst. The fluffy polymer/catalyst mixture was dried, compacted into disks, and the compacted disks were pulverized to form a granular composite seed catalyst having a high bulk density. To demonstrate the use of this $Et_2Cd/H_2O$ composite seed catalyst, 100 ml. of ethylene sulfide dissolved in 400 ml. of lactol spirits were polymerized under a nitrogen atmosphere using 6.9 g. of the composite seed catalyst. The polymerization reaction was carried out at a temperature of 80° C. for 2 hours, and yielded 33.5 g. of a granular, high molecular weight poly(ethylene sulfide) having a high bulk density.

EXAMPLE X

Preparation and use of composite seed catalyst from diethyl zinc/acetone for homopolymerization of ethylene sulfide—A clear, colorless solution of an episulfide polymerization catalyst was prepared by mixing 200 ml. of tetrahydrofuran, 7.6 ml. of diethyl zinc, and 1.8 ml. of acetone in a solution bottle. After aging for 26 hours, 200 ml. of this tetrahydrofuran solution were added to a reactor containing 50 ml. of ethylene sulfide dissolved in 400 ml. of benzene. The reaction mixture was warmed to a temperature of about 40° C. and held at this temperature for 18 hours, during which time a flocculent precipitate formed. The flocculent precipitate which was composed of a mixture of polymer and episulfide polymerization catalyst, was recovered by filtration and dried, yielding 50 g. of a fluffy polymer/catalyst mixture. This fluffy material was then compacted and pulverized to form the granular composite seed catalyst having a high bulk density. One hundred milliliters of ethylene sulfide dissolved in 400 ml. of lactol spirits were polymerized for 2 hours at 80° C., using this composite seed catalyst, and yielded 97 percent of theory of a granular high molecular weight poly(ethylene sulfide). M.P. 210° C., having a bulk density approximately equal to that of the composite seed catalyst used to prepare the polymer.

EXAMPLE XI

Preparation and use of composite seed catalyst from diethyl zinc/butyl mercaptan for homopolymerization of ethylene sulfide.—A slightly turbid solution of an episulfide polymerization was formed upon mixing in a solution bottle 200 ml. of tetrahydrofuran, 7.4 ml. of diethyl zinc, and 2.34 ml. of n-butyl mercaptan. After aging for 2 hours, this solution was added to a reactor which contained 50 ml. of ethylene sulfide dissolved in 400 ml. of benzene. The reaction mixture was gradually warmed to 45° C., and maintained at this temperature for 2 hours. yielding a fluffy polymer/catalyst mixture. The reaction product was recovered by filtration and dried to yield 24 g. of a low bulk density polymer/catalyst. As before, the granular composite seed catalyst was prepared by compacting and then pulverizing this fluffy polymer/catalyst. Using 2.4 g. of this composite seed catalyst, 100 ml. of ethylene sulfide dissolved in 400 ml. of lactol spirits were polymerized for 2 hours at a temperature of 80° C., yielding 99 percent of theory of a granular, high molecular weight homopolymer of ethylene sulfide having a high bulk density.

EXAMPLE XII

Preparation and use of composite seed catalyst from diphenyl zinc/water.—A solution bottle was charged with 100 ml. of tetrahydrofuran, 40 ml. of a solution of diphenyl zinc (10 millimoles) in xylene, and 0.048 ml. of water, which reaction formed a slightly cloudy solution. This solution was then slowly added, with agitation, to a mixture of 50 g. of ethylene sulfide in 250 ml. of benzene. The reaction was exothermic which caused the temperature of the reaction mixture to rise to 38° C., at which temperature the reaction mixture was maintained for 2 hours. The resulting low bulk density polymer/catalyst mixture was filtered off and dried to yield 49.6 grams of flocculent polymer/catalyst product which, in turn, was compacted and pulverized to form the composite seed catalyst. High bulk density polymers based on ethylene sulfide and/or isobutylene sulfide may be prepared with this catalyst using the procedures described above.

EXAMPLE XIII

Preparation and use of composite seed catalyst from dibutyl zinc/water.—A solution bottle was charged with 100 ml. of tetrahydrofuran, 0.20 ml. water, and 4.10 ml. of a solution of dibutyl zinc in benzene [0.61 ml.=1.11 millimoles of dibutyl zinc], forming a solution of an episulfide polymerization catalyst which yellowed in about 2 minutes. A reactor was then charged with 100 ml. of ethylene sulfide, 400 ml. of benzene, and 80 ml. of the tetrahydrofuran solution of the catalyst. Due to the exothermic nature of the reaction, the temperature of the reaction mixture climbed to 52° C. A polymer (containing the catalyst) immediately formed which was recovered by filtration and dried. The yield was 50.9 grams of a catalytically active mixture of polymer/catalyst having a low bulk density. After compacting this product to form a composite seed catalyst, high bulk density polymers based on ethylene sulfide and/or isobutylene sulfide may be prepared with this composite seed catalyst using the procedures described above.

EXAMPLE XIV

Preparation of composite seed catalysts using varying mole ratios of diethyl zinc/water.—To demonstrate the preparation and use of composite seed catalysts formed from diethyl zinc/water episulfide polymerization catalysts in which the mole ratio of diethyl zinc to water has been varied, a series of four composite seed catalysts was prepared under identical reaction conditions, but using diethyl zinc/water episulfide polymerization catalysts in which the mole ratio of diethyl zinc to water varied from 1:0.7 to 1:3. In each instance, a tetrahydrofuran solution (or slurry in Examples 14–C and 14–D) of the diethyl zinc/water episulfide polymerization catalyst (prepared from 44.4 millimoles of diethyl zinc) was added to a reactor containing 100 ml. of ethylene sulfide and 800 ml. of benzene and the resultant reaction mixture allowed to polymerize to form a fluffy polymer/catalyst mixture which, in turn, was dried and compacted into a composite seed catalyst having a bulk density of 350±50 grams per liter prior to use. Table I sets forth the reaction conditions under which each of these composite seed catalysts was prepared.

ducted at autogenous pressure for 2 hours at a temperature of 80° C. The first polymerization reaction (employing 5.0 g. of zinc carbonate) yielded 84 g. of a fluffy polymer having a bulk density of 190 grams per liter, while the second polymerization reaction (employing 2.5 g. of zinc carbonate) yielded 55 g. of a fluffy polymer having a bulk density of 174 grams per liter. Both polymers contained substantially all of the zinc carbonate used to form the particular polymer. Each polymer (containing zinc carbonate) was then compacted into pellets and the compacted pellets crushed to form the granular composite seed catalyst. The composite seed catalyst from the first polymerization reaction was designated as "Seed Catalyst A" while that prepared from the second polymerization reaction was designated as "Seed Catalyst B." Both composite seed catalysts were then used to form granular, high molecular weight polymers of ethylene sulfide.

To evaluate both composite seed catalysts, 100 g. of ethylene sulfide dissolved in 400 ml. of lactol spirits were polymerized in a stainless steel bomb at autogenous pressures for 2 hours at 80° C., using 75 g. of Seed Catalyst A in the first test and 48 g. of Seed Catalyst B in the second test. Each test yielded granular, high molecular weight homopolymers of ethylene sulfide, M.P. 197–199° C. and 202–205° C., respectively, having a bulk density in the range from 300 to 400 grams per liter, which approximately corresponded to the bulk density of the composite seed catalyst used to prepare the polymers. Upon analysis, 4 g. samples of each of these polymers were found to have a total flow time, at 235° C., between 3 and 4 minutes when each polymer had been stabilized with 1 percent by weight of diethylene triamine.

EXAMPLE XVI

Preparation and use of composite seed catalysts from zinc oxide and zinc hydroxide.—Zinc oxide and zinc hydroxide were also used to prepare composite seed catalysts from which granular, high molecular weight poly(vicinal episulfides) having a high bulk density may be formed in accordance with the process of the invention. Two composite seed catalysts were prepared, respectively, from zinc oxide and zinc hydroxide by polymerizing 100 g. of

TABLE I

| Reaction Conditions | Example | | | |
|---|---|---|---|---|
| | 14-A | 14-B | 14-C | 14-D |
| Mole ratio of diethyl zinc to water | 1:0.7 | 1:1 | 1:1.2 | 1:3 |
| Preparation of episulfide polymerization catalyst: | | | | |
| Tetrahydrofuran (ml.) | 400 | 400 | 400 | 400 |
| Water (ml.) | 0.56 | 0.80 | 0.96 | 2.40 |
| Diethyl zinc (ml.) | 10.92 | 10.92 | 10.92 | 10.92 |
| Preparation of composite seed catalysts: | | | | |
| Ethylene sulfide (ml.) | 100 | 100 | 100 | 100 |
| Benzene (ml.) | 800 | 800 | 800 | 800 |
| Yield (g.) | 71 | 69 | 66 | 48 |
| Polymerization temp. | 35° C. | 30° C. | <40° C. | <40° C. |

Each of these composite polymerization catalysts was used to prepare granular, high molecular weight homopolymers and copolymers of ethylene sulfide having a high bulk density. In each instance, the bulk density of the resultant polymer was approximately equal to the bulk density of the particular composite seed catalyst from which such polymer was prepared.

EXAMPLE XV

Preparation and use of composite seed catalysts containing zinc carbonate.—Zinc carbonate is an excellent episulfide polymerization catalyst which may be used to form composite seed catalysts in accordance with the process of the invention. Two composite seed catalysts were separately prepared by polymerizing 100 g. of ethylene sulfide in 400 ml. of lactol spirits in a stainless steel bomb, using 5.0 g. of zinc carbonate in the first reaction and 2.5 g. of zinc carbonate in the second reaction. In both instances, the polymerization reactions were conethylene sulfiide dissolved in 400 ml. of heptane in a stainless steel polymerization bomb for 2 hours at 80° C., using 10 g. of the catalyst (zinc oxide or zinc hydroxide) for each polymerization reaction. The ZnO-catalyzed reaction yielded 92 percent by weight of seed polymer, while the $Zn(OH)_2$-catalyzed reaction yielded 56 percent by weight of seed polymer, both of which polymers had low bulk densities. Prior to further use in a polymerization reaction, each seed polymer (containing, respectively, substantially all of the zinc oxide or zinc hydroxide used to form such polymer) was compacted into disks and the compacted disks then pulverized to form the granular composite seed polymer.

Ninety grams of the compacted, ZnO-catalyzed seed polymer were used to polymerize 100 g. of ethylene sulfide in 400 ml. of lactol spirits for 2 hours at 80° C., yielding 40 percent by weight of a granular, high molecular weight poly(ethylene sulfide), M.P. 207–212° C., having a high bulk density. When stabilized with 1 percent by weight of diethylene triamine, this polymer had a melt index, at 235° C., of about 0.5 gram per minute.

Sixty grams of the compacted Zn(OH)$_2$-catalyzed seed polymer were used to polymerize 100 grams of ethylene sulfide in 400 ml. of lactol spirits for 2 hours at 80° C., yielding 60 percent by weight of a granular, high molecular weight poly(ethylene sulfide), M.P. 204–205° C., having a high bulk density. When stabilized with 1 percent by weight of diethylene triamine, this polymer had a melt index, at 235° C., of about 1.7 grams per minute.

The foregoing examples are illustrative of the ease with which normally solid, granular, high molecular weight polymers of ethylene sulfide having a high bulk density may be produced in accordance with the process of the invention. Although these examples demonstrate the use of several types of episulfide polymerization catalysts compacted into composite seed catalysts for the homopolymerization of ethylene sulfide and for the copolymerization of ethylene sulfide with other vicinal episulfides to produce polymers having bulk densities approximately equal to those of the composite seed catalysts from which they were prepared, the process of the invention is also applicable to the production of any normally solid, granular, high molecular weight polymer in which the major amount of recurring groups is derived from one or more vicinal episulfides and which has a high bulk density.

I claim:

1. A process for the production of normally solid, granular, high molecular weight polymers of vicinal episulfides having a high bulk density which comprises (a) compacting a solid, episulfide polymerization catalyst into particles until the bulk density of such particles is not less than 300 grams per liter and is approximately equal to the bulk density desired for the polymer which is to be prepared from such catalyst, and (b) polymerizing a monomer reaction system containing a major amount of a vicinal episulfide monomer by bringing the monomer reaction system into contact with a catalytic amount of the compacted particles of the episulfide polymerization catalyst, thereby forming a normally solid, granular, high molecular weight polymer in which the major amount of recurring groups is derived from the vicinal episulfide monomer contained in the monomer reaction system and which has a bulk density approximately equal to that of the compacted episulfide polymerization catalyst.

2. A process for the production of normally solid, granular, high molecular weight polymers of vicinal episulfides having a high bulk density which comprises (a) forming a solid, episulfide polymerization catalyst by reacting a zinc dialkyl with water, (b) compacting the episulfide polymerization catalyst into particles until the bulk density of such particles is not less than 300 grams per liter and is approximately equal to the bulk density desired for the polymer which is to be prepared from such catalyst, and (c) polymerizing a monomer reaction system containing a major amount of a vicinal episulfide monomer by bringing the monomer reaction system into contact with a catalytic amount of the compacted particles of the episulfide polymerization catalyst, thereby forming a normally solid, granular, high molecular weight polymer in which the major amount of recurring groups is derived from the vicinal episulfide monomer contained in the monomer reaction system and which has a bulk density approximately equal to that of the compacted episulfide polymerization catalyst.

3. A process for the production of normally solid, granular, high molecular weight polymers of ethylene sulfide having a high bulk density which comprises (a) compacting a solid, episulfide polymerization catalyst into particles until the bulk density of such particles is not less than 300 grams per liter and is approximately equal to the bulk density desired for the polymer which is to be prepared from such catalyst, and (b) polymerizing a monomer reaction system containing a major amount of ethylene sulfide monomer by bringing the monomer reaction system into contact with a catalytic amount of the compacted particles of the episulfide polymerization catalyst, thereby forming a normally solid, granular, high molecular weight polymer in which the major amount of recurring groups is derived from ethylene sulfide and which is characterized by (i) a melting point not less than 150° C., and (ii) a bulk density approximately equal to that of the compacted episulfide polymerization catalyst.

4. A process for the production of normally solid, granular, high molecular weight polymers of ethylene sulfide having a high bulk density which comprises (a) forming a solid, episulfide polymerization catalyst by reacting a zinc dialkyl with water (b) compacting the episulfide polymerization catalyst into particles until the bulk density of such particles is not less than 300 grams per liter and is approximately equal to the bulk density desired for the polymer which is to be prepared from such catalyst, and (c) polymerizing a monomer reaction system containing a major amount of ethylene sulfide monomer by bringing the monomer reaction system into contact with a catalytic amount of the compacted particles of the episulfide polymerization catalyst, thereby forming a normally solid, granular, high molecular weight polymer in which the major amount of recurring groups is derived from ethylene sulfide and which is characterized by (i) a melting point not less than 150° C., and (ii) a bulk density approximately equal to that of the compacted episulfide polymerization catalyst.

5. A process for the production of normally solid, granular, high molecular weight polymers of vicinal episulfides having a high bulk density which comprises (a) bringing a first monomer reaction system containing at least one vicinal episulfide monomer into contact with a catalytic amount of a solid, episulfide polymerization catalyst to polymerize the first monomer reaction system into a solid polymer without substantially diminishing the catalytic activity of the episulfide polymerization catalyst, thereby forming a catalytically active mixture of polymer and episulfide polymerization catalyst, (b) forming a composite seed catalyst by compacting the catalytically active mixture into particles until the bulk density of such particles is not less than 300 grams per liter and is approximately equal to the bulk density desired for the polymer which is to be prepared from such composite seed catalyst, and (c) polymerizing a second monomer reaction system containing a major amount of a vicinal episulfide monomer by bringing the second monomer reaction system into contact with the composite seed catalyst, thereby forming a normally solid, granular, high molecular weight polymer in which the major amount of recurring groups is derived from the vicinal episulfide monomer contained in the second monomer reaction system and which has a bulk density approximately equal to that of the composite seed catalyst.

6. A process for the production of normally solid, granular, high molecular weight polymers of vicinal episulfides having a high bulk density which comprises (a) bringing a first monomer reaction system containing at least one vicinal episulfide monomer selected from the group consisting of ethylene sulfide, propylene sulfide, isobutylene sulfide, or styrene sulfide, into contact with a catalytic amount of a solid, episulfide polymerization catalyst to polymerize the first monomer reaction system into a solid polymer without substantially diminishing the catalytic activity of the episulfide polymerization catalyst, thereby forming a catalytically active mixture of polymer and episulfide polymerization catalyst, (b) forming a composite seed catalyst by compacting the catalytically active mixture into particles until the bulk density of such particles is not less than 300 grams per liter and is approximately equal to the bulk density desired for the polymer which is to be prepared from such composite seed catalyst, and (c) polymerizing a second monomer reaction system containing a major amount of a vicinal episulfide monomer by bringing the second monomer reaction system into contact with the composite seed catalyst, thereby forming a normally solid, granular, high molecular weight polymer in which the major amount of recurring groups is derived from the vicinal episulfide monomer contained in the second monomer reaction system and which has a bulk density approximately equal to that of the composite seed catalyst.

7. A process for the production of normally solid, granular, high molecular weight polymers of vicinal episulfides having a high bulk density which comprises (a) bringing a first monomer reaction system containing a major amount of ethylene sulfide into contact with a catalytic amount of a solid, episulfide polymerization catalyst to polymerize the first monomer reaction system into a solid polymer without substantially diminishing the catalytic activity of the episulfide polymerization catalyst, thereby forming a catalytically active mixture of polymer and episulfide polymerization catalyst, (b) forming a composite seed catalyst by compacting the catalytically active mixture into particles until the bulk density of such particles is not less than 300 grams per liter and is approximately equal to the bulk density desired for the polymer which is to be prepared from such composite seed catalyst, and (c) polymerizing a second monomer reaction system containing a major amount of a vicinal episulfide monomer by bringing the second monomer reaction system into contact with the composite seed catalyst, to form a normally solid, granular, high molecular weight polymer in which the major amount of recurring groups is derived from the vicinal episulfide monomer contained in the second monomer reaction system and which has a bulk density approximately equal to that of the composite seed catalyst.

8. A process for the production of normally solid, granular, high molecular weight polymers of vicinal episulfides in accordance with claim 7, in which the first monomer reaction system also contains a minor amount of at least one other vicinal episulfide selected from the group consisting of propylene sulfide, 1,2-butylene sulfide, 2,3-butylene sulfide, isobutylene sulfide, cyclohexene sulfide, vinyl cyclohexane episulfide, vinyl cyclohexene episulfide, styrene sulfide, paramethylstyrene episulfide, butadiene episulfide, 2-benzyl thiirane, 1,2-epoxy-3,4-epithiobutane, or allyl thioglycidyl ether.

9. A process for the production of normally solid, granular, high molecular weight polymers of ethylene sulfide having a high bulk density which comprises (a) bringing a first monomer reaction system containing a major amount of ethylene sulfide into contact with a catalytic amount of a solid, episulfide polymerization catalyst to polymerize the first monomer reaction system into a solid polymer without substantially diminishing the catalytic activity of the episulfide polymerization catalyst, thereby forming a catalytically active mixture of polymer and episulfide polymerization catalyst, (b) forming a composite seed catalyst by compacting the catalytically active mixture into particles until the bulk density of such particles is not less than 300 grams per liter and is approximately equal to the bulk density desired for the polymer which is to be prepared from such composite seed catalyst, and (c) polymerizing a second monomer reaction system containing a major amount of ethylene sulfide by bringing the second monomer reaction system into contact with the composite seed catalyst, thereby forming a normally solid, granular, high molecular weight polymer in which the major amount of recurring groups is derived from ethylene sulfide and which is characterized by (i) a melting point not less than 150° C., and (ii) a bulk density approximately equal to that of the composite seed catalyst.

10. A process for the production of normally solid, granular, high molecular weight polymers of ethylene sulfide having a high bulk density which comprises (a) bringing a first monomer reaction system containing a major amount of ethylene sulfide and a minor amount of at least one other vicinal episulfide monomer into contact with a catalytic amount of a solid, episulfide polymerization catalyst to polymerize the first monomer reaction system into a solid polymer without substantially diminishing the catalytic activity of the episulfide polymerization catalyst, thereby forming a catalytically active mixture of polymer and episulfide polymerization catalyst, (b) forming a composite seed catalyst by compacting the catalytically active mixture into particles until the bulk density of such particles is not less than 300 grams per liter and is approximately equal to the bulk density desired for the polymer which is to be prepared from such composite seed catalyst, and (c) polymerizing a second monomer reaction system containing a major amount of ethylene sulfide by bringing the second monomer reaction system into contact with the composite seed catalyst, thereby forming a normally solid, granular, high molecular weight polymer in which the major amount of recurring groups is derived from ethylene sulfide and which has a bulk density approximately equal to that of the composite seed catalyst.

11. A process for the production of normally solid, granular, high molecular weight polymers of ethylene sulfide having a high bulk density which comprises (a) forming a solid, episulfide polymerization catalyst by reacting a zinc dialkyl with water, (b) bringing a first monomer reaction system containing a major amount of ethylene sulfide into contact with a catalytic amount of the episulfide polymerization catalyst to polymerize the first monomer reaction system into a solid polymer without substantially diminishing the catalytic activity of the episulfide polymerization catalyst, thereby forming a catalytically active mixture of polymer and episulfide polymerization catalyst, (c) forming a composite seed catalyst by compacting the catalytically active mixture into particles until the bulk density of such particles is not less than 300 grams per liter and is approximately equal to the bulk density desired for the polymer which is to be prepared from such composite seed catalyst, and (d) polymerizing a second monomer reaction system containing a major amount of ethylene sulfide by bringing the second monomer reaction system into contact with the composite seed catalyst, thereby forming a normally solid, granular, high molecular weight polymer in which the major amount of recurring groups is derived from ethylene sulfide and which has a bulk density approximately equal to that of the composite seed catalyst.

12. A process for the production of normally solid, granular, high molecular weight polymers of ethylene sulfide having a high bulk density which comprises (a) forming a solid, episulfide polymerization catalyst by reacting a zinc dialkyl with water, (b) bringing a first monomer reaction system containing a major amount of ethylene sulfide and a minor amount of at least one other vicinal episulfide monomer into contact with a catalytic amount of the episulfide polymerization catalyst to polymerize the first monomer reaction system into a solid polymer without substantially diminishing the catalytic activity of the episulfide polymerization catalyst, thereby forming a catalytically active mixture of polymer and episulfide polymerization catalyst, (c) forming a composite seed catalyst by compacting the catalytically active mixture into particles until the bulk density of such particles is in the range from about 300 to about 400 grams per liter and is approximately equal to the bulk density desired for the polymer which is to be prepared from such composite seed catalyst, and (d) polymerizing a second monomer reaction system containing a major amount of ethylene sulfide by bringing the second monomer reaction system into contact with the composite seed catalyst, thereby forming a normally solid, granular, high molecular weight polymer in which the major amount of recurring groups is derived from ethylene sulfide and which is characterized by (i) a melt index, at 215° C., of less than 2.5 grams per minute, and (ii) a bulk density approximately equal to that of the composite seed catalyst.

13. A process for the production of normally solid, granular, high molecular weight polymers of ethylene sulfide having a high bulk density which comprises (a) bringing a first monomer reaction system containing at least one vicinal episulfide monomer into contact with a solid, episulfide polymerization catalyst to polymerize the first monomer reaction system into a solid polymer without substantially diminishing the catalytic activity of the episulfide polymerization catalyst, thereby forming a catalytically active mixture of polymer and episulfide polymerization catalyst, (b) forming a composite seed catalyst by compacting the catalytically active mixture into particles until the bulk density of such particles is not less than 300 grams per liter and is approximately equal to the bulk density desired for the polymer which is to be prepared from such composite seed catalyst, and (c) homopolymerizing ethylene sulfide by bringing the monomer into contact with the composite seed catalyst, thereby forming a normally solid, granular, high molecular weight polymer of ethylene sulfide which is characterized by (i) a melt index, at 215° C., of less than 2.5 grams per minute, (ii) a melting point of not less than 195° C., and (iii) a bulk density approximately equal to that of the composite seed catalyst.

14. A process for the production of normally solid, granular, high molecular weight polymers of ethylene sulfide having a high bulk density which comprises (a) bringing a monomer reaction system containing a major amount of ethylene sulfide and a minor amount of at least one other vicinal episulfide monomer into contact with a solid, episulfide polymerization catalyst to polymerize the monomer reaction system into a solid polymer without substantially diminishing the catalytic activity of the episulfide polymerization catalyst, thereby forming a catalytically active mixture of polymer and episulfide polymerization catalyst, (b) forming a composite seed catalyst by compacting the catalytically active mixture into particles until the bulk density of such particles is in the range from 300 to 400 grams per liter and is approximately equal to the bulk density desired for the polymer which is to be prepared from such composite seed catalyst, and (c) homopolymerizing ethylene sulfide by bringing the monomer into contact with the composite seed catalyst, thereby forming a normally solid, granular, high molecular weight polymer of ethylene sulfide which is characterized by (i) a melt index, at 215° C., of less than 2.5 grams per minute, (ii) a melting point of not less than 195° C., and (iii) a bulk density approximately equal to that of the composite seed catalyst.

15. A process for the production of normally solid, granular, high molecular weight polymers of ethylene sulfide having a high bulk density which comprises (a) forming a solid, episulfide polymerization catalyst by reacting a zinc dialkyl with water, (b) bringing a monomer reaction system containing a major amount of ethylene sulfide and a minor amount of at least one other vicinal episulfide monomer into contact with the solid, episulfide polymerization catalyst to polymerize the monomer reaction system into a solid polymer without substantially diminishing the catalytic activity of the episulfide polymerization catalyst, thereby forming a catalytically active mixture of polymer and episulfide polymerization catalyst, (c) forming a composite seed catalyst by compacting the catalytically active mixture into particles until the bulk density of such particles is in the range from 300 to 400 grams per liter and approximately equal to the bulk density desired for the polymer which is to be prepared from such composite seed catalyst, and (d) homopolymerizing ethylene sulfide by bringing the monomer into contact with the composite seed catalyst, thereby forming a normally solid, granular, high molecular weight polymer of ethylene sulfide which is characterized by (i) a melt index, at 215° C., of less than 2.5 grams per minute, (ii) a melting point of not less than 195° C., and (iii) a bulk density approximately equal to that of the composite seed catalyst.

16. A process for the production of normally solid, granular, high molecular weight homopolymers of ethylene sulfide having a high bulk density which comprises (a) forming a solid, episulfide polymerization catalyst by reacting a zinc dialkyl with water, (b) bringing ethylene sulfide into contact with the solid, episulfide polymerization catalyst to polymerize the ethylene sulfide into a solid, fluffy polymer without substantially diminishing the catalytic activity of the episulfide polymerization catalyst, thereby forming a catalytically active mixture of polymer and episulfide polymerization catalyst, (c) forming a composite seed catalyst by compacting the catalytically active mixture into particles until the bulk density of such particles is in the range from 300 to 400 grams per liter and is approximately equal to the bulk density desired for the homopolymer which is to be prepared from such composite seed catalyst, and (d) homopolymerizing ethylene sulfide by bringing the monomer into contact with the composite seed catalyst, thereby forming a normally solid, granular, high molecular weight homopolymer of ethylene sulfide which is characterized by (i) a melt index, at 215° C., of less than 2.5 grams per minute, (ii) a melting point of not less than 195° C., and (iii) a bulk density approximately equal to that of the composite seed catalyst.

References Cited

UNITED STATES PATENTS

| | | | |
|---|---|---|---|
| 3,300,454 | 1/1967 | Osborn | 260—79 |
| 3,317,489 | 5/1967 | Sander | 260—79 |
| 3,317,919 | 5/1967 | Sander | 260—79 |
| 3,317,920 | 5/1967 | Sander | 260—79 |
| 3,324,051 | 6/1967 | Lal | 260—79.7 |
| 3,325,456 | 6/1967 | Adamek et al. | 260—79.7 |
| 3,329,659 | 7/1967 | Gobran et al. | 260—79.7 |

OTHER REFERENCES

Dermer, Copolymers of Olefin Sulfides, ASTIA Document No. AD110,496, WADC Technical Report 55–447, June 1956, pp. 10, 11, 12, 13 and 31.

Freidlin et al., Chemical Abstracts, vol. 48, 13383c (1954).

Boileau et al., Academie des Sciences Comptes Rendus, pp. 2774 through 2776, Apr. 9, 1962.

DONALD E. CZAJA, *Primary Examiner.*

M. I. MARQUIS, *Assistant Examiner.*